United States Patent
Heger

(10) Patent No.: US 9,991,572 B2
(45) Date of Patent: Jun. 5, 2018

(54) ARRANGEMENT AND METHOD FOR COOLING A TECHNICAL COMPONENT INCLUDING VAPORIZING WATER BY RESIDUAL THERMAL ENERGY

(71) Applicant: Bayerische Motoren Werke Aktiengesellschaft, Munich (DE)

(72) Inventor: Martin Heger, Kreuzholzhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 211 days.

(21) Appl. No.: 14/919,544

(22) Filed: Oct. 21, 2015

(65) Prior Publication Data
US 2016/0043452 A1   Feb. 11, 2016

Related U.S. Application Data

(63) Continuation of application No. PCT/EP2014/056773, filed on Apr. 4, 2014.

(30) Foreign Application Priority Data

Apr. 25, 2013   (DE) .................. 10 2013 207 487

(51) Int. Cl.
*H01M 10/63* (2014.01)
*H01M 10/625* (2014.01)
(Continued)

(52) U.S. Cl.
CPC ......... *H01M 10/63* (2015.04); *H01M 2/1264* (2013.01); *H01M 10/625* (2015.04);
(Continued)

(58) Field of Classification Search
CPC .............. H01M 10/625; H01M 10/63; H01M 10/6569; H01M 2/1264
(Continued)

(56) References Cited

U.S. PATENT DOCUMENTS 8,876,947 B2    11/2014 Reitzle et al.
2004/0231834 A1  11/2004 Shibata et al.
(Continued)

FOREIGN PATENT DOCUMENTS

CN      102947970 A     2/2013
CN      102971572 A     3/2013
(Continued)

OTHER PUBLICATIONS

Kamata, Toru, Machine translation of JP 2013-067198 A, Apr. 2013.*
(Continued)

*Primary Examiner* — Sean P Cullen
(74) *Attorney, Agent, or Firm* — Crowell & Moring LLP

(57) ABSTRACT

An arrangement in a motor vehicle includes a housing configured to accommodate a technical component, at least one pressure equalization element integrated into the housing, a cooling device configured to cool the technical component in the housing, and a control device configured to control the cooling device. The control device is configured such that, in the event of an exceedance of a temperature threshold value in the housing, the control device increases the cooling power of the cooling device in order to attain a first temperature value in the housing. After such an increase, proceeding from a second temperature value in the housing, the control device decreases the cooling power such that thermal residual energy of the technical component is sufficient to evaporate the condensation water generated in the housing as a result of the cooling, wherein the second temperature value is higher than the first temperature value.

9 Claims, 1 Drawing Sheet

(51) Int. Cl.
  *H01M 10/6569* (2014.01)
  *H01M 2/12* (2006.01)
  *H02B 1/56* (2006.01)
  *H05K 7/20* (2006.01)
  *H01M 10/48* (2006.01)
  *H01M 10/613* (2014.01)

(52) U.S. Cl.
  CPC ...... *H01M 10/6569* (2015.04); *H01M 10/486* (2013.01); *H01M 10/613* (2015.04); *H01M 2220/20* (2013.01)

(58) Field of Classification Search
  USPC .............................................. 429/50, 62, 120
  See application file for complete search history.

(56) References Cited

U.S. PATENT DOCUMENTS

| | | | |
|---|---|---|---|
| 2006/0078786 A1* | 4/2006 | Wu | ............... H01M 2/1022 429/62 |
| 2013/0111939 A1 | 5/2013 | Yan | |
| 2013/0126008 A1 | 5/2013 | Pint et al. | |
| 2013/0209844 A1 | 8/2013 | Gless et al. | |

FOREIGN PATENT DOCUMENTS

| | | |
|---|---|---|
| DE | 10 2004 021 909 A1 | 11/2004 |
| DE | 10 2008 012 705 A1 | 9/2009 |
| DE | 10 2009 054 921 A1 | 6/2011 |
| DE | 10 2009 054 922 A1 | 6/2011 |
| DE | 10 2010 003 257 A1 | 9/2011 |
| DE | 10 2010 003 367 A1 | 12/2011 |
| DE | 10 2010 051 687 A1 | 5/2012 |
| JP | 2013067198 A * | 4/2013 |
| WO | WO 2012/065664 A1 | 5/2012 |
| WO | WO 2013/037786 A1 | 3/2013 |

OTHER PUBLICATIONS

PCT/EP2014/056773, International Search Report dated Jun. 18, 2014 (Two (2) pages).

German Search Report issued in counterpart German Application No. 10 2013 207 487.5 with Statement of Relevancy (Five (5) pages).

Chinese Office Action issued in Chinese counterpart application No. 201480012907.8 dated Oct. 31, 2016, with partial English translation (Eight (8) pages).

* cited by examiner

ARRANGEMENT AND METHOD FOR COOLING A TECHNICAL COMPONENT INCLUDING VAPORIZING WATER BY RESIDUAL THERMAL ENERGY

CROSS REFERENCE TO RELATED APPLICATIONS

This application is a continuation of PCT International Application No. PCT/EP2014/056773, filed Apr. 4, 2014, which claims priority under 35 U.S.C. § 119 from German Patent Application No. 10 2013 207 487.5, filed Apr. 25, 2013, the entire disclosures of which are herein expressly incorporated by reference.

BACKGROUND AND SUMMARY OF THE INVENTION

The present invention relates to an arrangement and to a method for cooling a technical component, in particular an energy storage module, in a housing. The arrangement and the method are preferably used in a vehicle.

Housings which are provided for accommodating a technical component such as, for example, an energy storage module (also referred to as battery) in a vehicle must meet a series of demands in order to comply with the changing operating conditions of a vehicle. Such housings serve to protect the energy storage module against ambient influences, for example water or dirt. During the operation of the energy storage module, heat is produced which is typically discharged from the interior of the housing by a radiator or a coolant vaporizer. Moisture, which enters the interior of the housing through, for example, a pressure equalization element, can therefore condense in the interior of the housing owing to the cooling. This condensation water has to be discharged in order to prevent the operation of the technical component from being adversely affected. During the discharging of the condensate, it is also necessary to ensure that this process cannot allow impurities or other liquids to enter the housing.

It is known to use float valves to implement discharging of condensate. These valves keep an outflow cross section at the base of the housing open, in order to permit the condensate to flow out continuously. The float valve closes the cross section if water attempts to penetrate the interior of the housing from below. However, such a float valve for discharging condensate at the base surface of the housing is sensitive to soiling with the result that, on the one hand, the discharging of condensate can be adversely affected and, on the other hand, the penetration of water into the housing can be promoted. The latter can become a problem, in particular in the case of what are referred to as Watt processes, since a soiled float valve can no longer reliably close the opening of the valve. In other previously known arrangements, active pumps are used to pump the condensate out of the housing.

One object of the present invention is to make available an arrangement for cooling a technical component in a housing which functions with low maintenance and in an energy-efficient and operationally reliable fashion with cost-effective production. Furthermore, an object of the present invention is to specify a corresponding method for operating the arrangement.

One or more embodiments of the present invention may be achieved by means of an arrangement which is used, in particular, in a motor vehicle. The arrangement comprises a housing for accommodating a technical component, at least one pressure equalization element integrated into the housing and a cooling device. The cooling device serves to cool the technical component in the housing. Accordingly, at least part of the cooling device is arranged in the interior of the housing. The arrangement furthermore comprises a control device for actuating the cooling device. The control device is designed to actuate the cooling device such that when a temperature limiting value in the housing is exceeded, said control device increases the cooling power of the cooling device. In particular, the cooling device is not actuated until this temperature limiting value is exceeded. The objective of increasing the cooling power is to reduce the temperature in the housing to a first temperature value. Moreover, the control device is designed such that said control device reduces the cooling power again when a second temperature value is reached. The second temperature value is higher than the first temperature value. The cooling power is therefore already reduced, in particular to zero, by means of the control device even before the desired first temperature value is attained. As a result, residual thermal energy remains in the technical component. Said residual thermal energy is used to vaporize the condensation water generated in the interior of the housing as a result of the cooling. Condensation water which forms is therefore vaporized by the residual thermal energy and can flow outward through the pressure equalization element. According to one embodiment of the invention, there is no need to discharge any water in the liquid state from the housing. The water is vaporized and can be discharged in the vaporous state via the pressure equalization element.

The technical component may be an energy storage module with electrochemical cells. In particular, this involves a high-voltage energy storage module which is used for providing the electric drive of the motor vehicle, which is the sole drive or an assisting drive. In particular, the energy storage modules must, on the one hand, be securely enclosed in a housing and, on the other hand, do not need any effective cooling. In this respect, the invention is to be particularly preferably applied.

Furthermore, the control device may be configured to completely switch off the cooling device starting from the second temperature value. The cooling power is therefore not only reduced, but rather the cooling device is completely deactivated, starting from the second temperature value.

The housing is preferably configured in a fluid-tight fashion and does not have any openings for discharging liquid condensation water. Of course, lines, for example for cooling fluid, can penetrate the housing wall.

The pressure equalization element preferably comprises a diaphragm. The diaphragm is permeable to water vapor and impermeable to water. As a result, pressure equalization is possible by means of the pressure equalization element. Water in a liquid form cannot pass in or out through the pressure equalization element.

The invention furthermore comprises a method for operating the described arrangement. The method comprises the following steps: (i) making available the housing of the arrangement with the technical component integrated therein, (ii) cooling the technical component with the objective of attaining a first temperature value in the housing, wherein condensation water forms in the housing during the cooling, (iii) reducing the cooling power as soon as a second temperature value is attained in the housing, in order to vaporize the condensation water in the housing with the residual thermal energy, wherein the second temperature value is higher than the first temperature value, and (iv)

discharging the vaporized condensation water via at least one pressure equalization element integrated into the housing.

The dependent claims and the advantageous refinements of the arrangement according to the invention are applied in a correspondingly advantageous way for the method according to the invention.

In particular, the second temperature value may be determined as a function of the duration of a cooling process and/or as a function of an ambient temperature and/or as a function of an ambient moisture and/or as a function of a location and/or as a function of a measured quantity of condensation water in the housing. The level of the second temperature water, in particular the interval between the first temperature value and the second temperature value, determines how much residual thermal energy remains in the technical component and can be used to vaporize the condensation water. If the ambient temperature and/or the ambient moisture are/is utilized, said ambient temperature or ambient moisture is preferably measured outside the housing. When the location is determined, for example with satellite navigation, it is possible to infer a corresponding ambient temperature or ambient moisture on the basis of the location data. This data in turn permits a conclusion to be drawn about the quantity of condensation water which is expected.

Furthermore, the second temperature value may be set in absolute terms as a function of the first temperature value. The second temperature value is here at least 105%, preferably at least 110%, particularly preferably at least 115%, of the first temperature value.

The first temperature value predefines an optimum operating temperature of the technical component. In particular, the first temperature value is below the temperature limiting value starting from which the cooling power is increased.

The first temperature value and the second temperature value are preferably measured at the same location. In particular, these temperature values are measured directly at the technical component.

The invention shows an arrangement and a method for efficiently cooling a technical component in a housing of a motor vehicle. By virtue of the invention, conspicuous structures for discharging the condensation water are dispensed with, as a result of which the costs of the arrangement can be reduced. Since no moving parts are used to discharge the condensation water, the susceptibility to faults is decreased. There is no need for separate mounting of specific parts for discharging the condensation water, as a result of which the production costs are decreased. Since no moving parts are used, there is no risk of soiling. The pressure equalization element constitutes the only connection to the surroundings. As a result of the diaphragm, soiling cannot enter.

Further details, features and advantages of the invention can be found in the following description and the figures. In the drawing:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
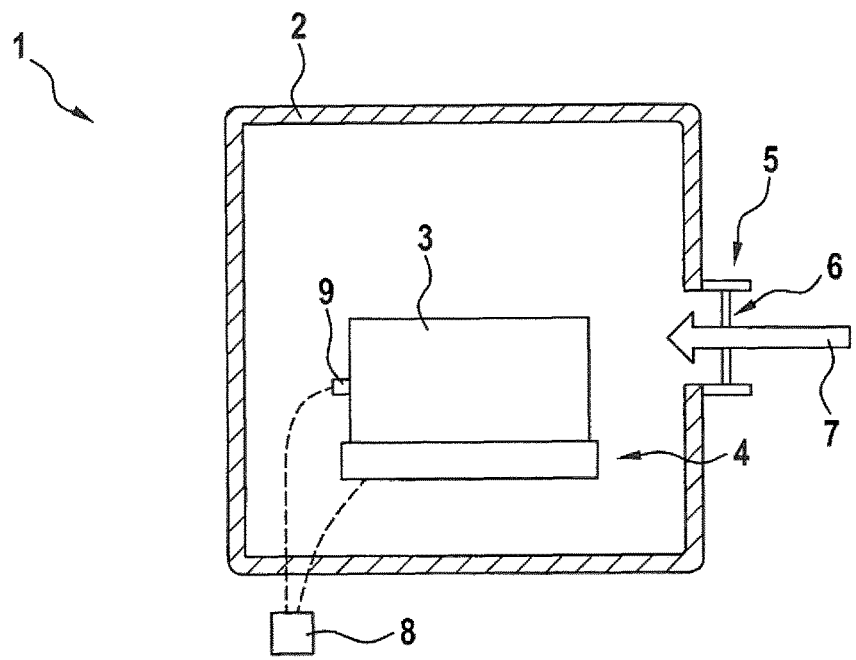
FIG. 1 shows a schematic view of an arrangement according to the invention according to an exemplary embodiment in a first state.
Figure 2:
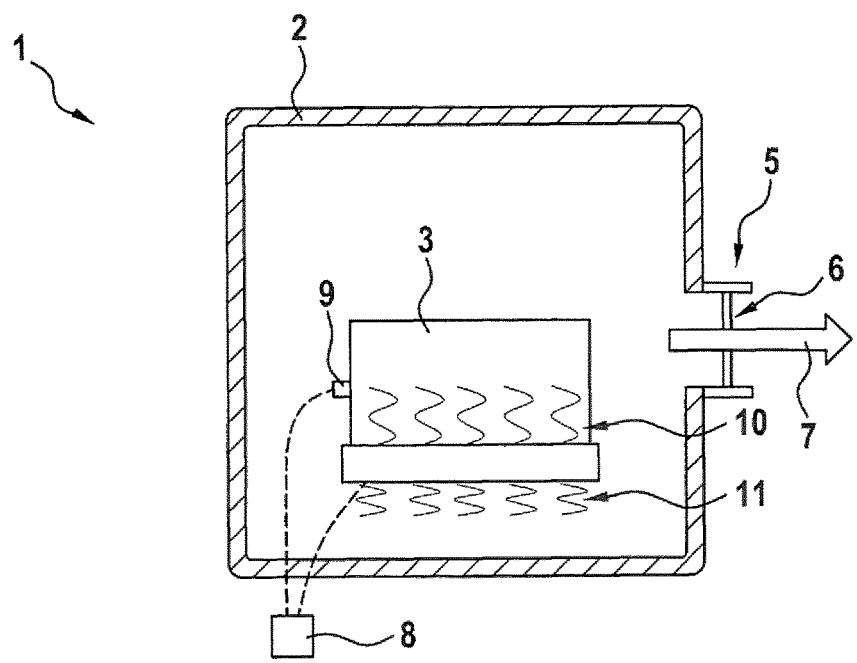
FIG. 2 shows a schematic view of the arrangement according to the invention according to the exemplary embodiment in a second state.

FIGS. 1 and 2 show an arrangement 1 comprising a housing 2 in which a technical component 3 is arranged. The housing 2 is mounted, in particular, on a motor vehicle. The technical component 3 is, in particular, an energy storage module.

A pressure equalization element 5 is integrated into the wall of the housing 2. This pressure equalization element 5 comprises a diaphragm 6. The diaphragm 6 is permeable to water vapor and impermeable to water.

A temperature measuring point 9 is provided on the technical component 3. Furthermore, a cooling device 4 for cooling the technical component 3 is located in the housing 2.

The temperature measuring point 9 and the cooling device 4 are connected to a control device 8.

FIG. 1 shows a state in which the cooling device 4 is activated, and therefore cools the interior of the housing 2. In this context, air and corresponding moisture flow into the housing 2 according to the indicated flow 7 via the diaphragm 6. The moisture in the air leads to the formation of condensation water in the interior of the housing 2. In particular, the condensation water is precipitated on the technical component 3 and on the cooling device 4.

Even before the desired optimum temperature is reached in the housing 2, the cooling device 4 is switched off by means of the control device 8. This state is shown by FIG. 2. Therefore, residual thermal energy 10 remains in the technical component 3 and vaporizes the condensation water 11 in the housing 2. The vaporized condensation water exits the pressure equalization element 5 according to the indicated flow 7 through the diaphragm 6.

LIST OF REFERENCE NUMBERS

1 Arrangement
2 Housing
3 Technical component
4 Cooling device
5 Pressure equalization element
6 Diaphragm
7 Flow
8 Control device
9 Temperature measuring point
10 Residual thermal energy
11 Condensation water The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an arrangement in a motor vehicle, the method comprising the acts of:
   making available a housing of the arrangement with a technical component in an interior of the housing;
   cooling the technical component in order to attain a first temperature value in the housing, wherein condensation water forms in the housing during the cooling;

reducing a cooling power starting from a second temperature value in the housing, such that the condensation water in the housing is vaporized with residual thermal energy of the technical component, wherein the second temperature value is higher than the first temperature value; and discharging the vaporized condensation water via at least one pressure equalization element integrated into the housing.

2. The method as claimed in claim 1, further comprising determining a level of the second temperature as a function of at least one of a duration of a cooling process, an ambient temperature, an ambient moisture, a location, a measured quantity of the condensation water in the housing.

3. The method as claimed in one of claim 1, wherein the first temperature value and the second temperature value are measured at a same location.

4. The method as claimed in one of claim 1, wherein the first temperature value and the second temperature value are measured at the technical component.

5. The method as claimed in claim 1, further comprising reducing the cooling power to zero starting from the second temperature value.

6. The method as claimed in claim 5, further comprising determining a level of the second temperature as a function of at least one of a duration of a cooling process, an ambient temperature, an ambient moisture, a location, a measured quantity of the condensation water in the housing.

7. The method as claimed in claim 1, wherein the second temperature value is at least 105% of the first temperature value.

8. The method as claimed in claim 7, wherein the second temperature value is at least 110% of the first temperature value.

9. The method as claimed in claim 8, wherein the second temperature value is at least 115% of the first temperature value.

* * * * *